United States Patent [19]
Osborn

[11] 3,921,482
[45] Nov. 25, 1975

[54] PIPE SLITTER APPARATUS

[75] Inventor: Jack S. Osborn, Tulsa, Okla.

[73] Assignee: Ree-Born Industries, Tulsa, Okla.

[22] Filed: Aug. 16, 1974

[21] Appl. No.: 497,939

[52] U.S. Cl................................. 83/185; 83/54
[51] Int. Cl.² ............................... B26D 1/18
[58] Field of Search ............ 83/185, 187, 188, 191, 83/192, 178, 54

[56] References Cited
UNITED STATES PATENTS

| | | | |
|---|---|---|---|
| 781,508 | 1/1905 | Fernow | 83/188 |
| 1,054,143 | 2/1913 | Plost | 83/187 X |
| 2,696,254 | 12/1954 | Mugavero | 83/187 X |
| 3,216,875 | 11/1965 | Wenthe | 83/54 X |
| 3,678,718 | 7/1972 | Brown et al. | 83/185 X |
| 3,751,941 | 2/1973 | Andrews et al. | 83/54 X |
| 3,851,552 | 12/1974 | English et al. | 83/191 X |

Primary Examiner—Frank T. Yost
Attorney, Agent, or Firm—Dunlap & Codding

[57] ABSTRACT

A pipe slitter apparatus comprising a cutter assembly having a blade holder and backup member held in spaced apart relationship by a first base member to form a pipe wall receiving channel therebetween, and cutter blades disposed on the blade holder span the pipe wall receiving channel. The cutter assembly is positioned so as to place the pipe wall receiving channel into receiving relationship with one end of a pipe wall, the other end of the pipe wall being restrained by a standoff assembly supported by a second base member. As the base members are moved in relative motion toward each other, one of the cutter blades, partially spanning the pipe wall receiving channel, pre-cuts the pipe wall, and another cutter blade, in cutting alignment with the other cutter blade and completely spanning the pipe wall receiving channel, completes the cut to slit the pipe wall.

10 Claims, 8 Drawing Figures

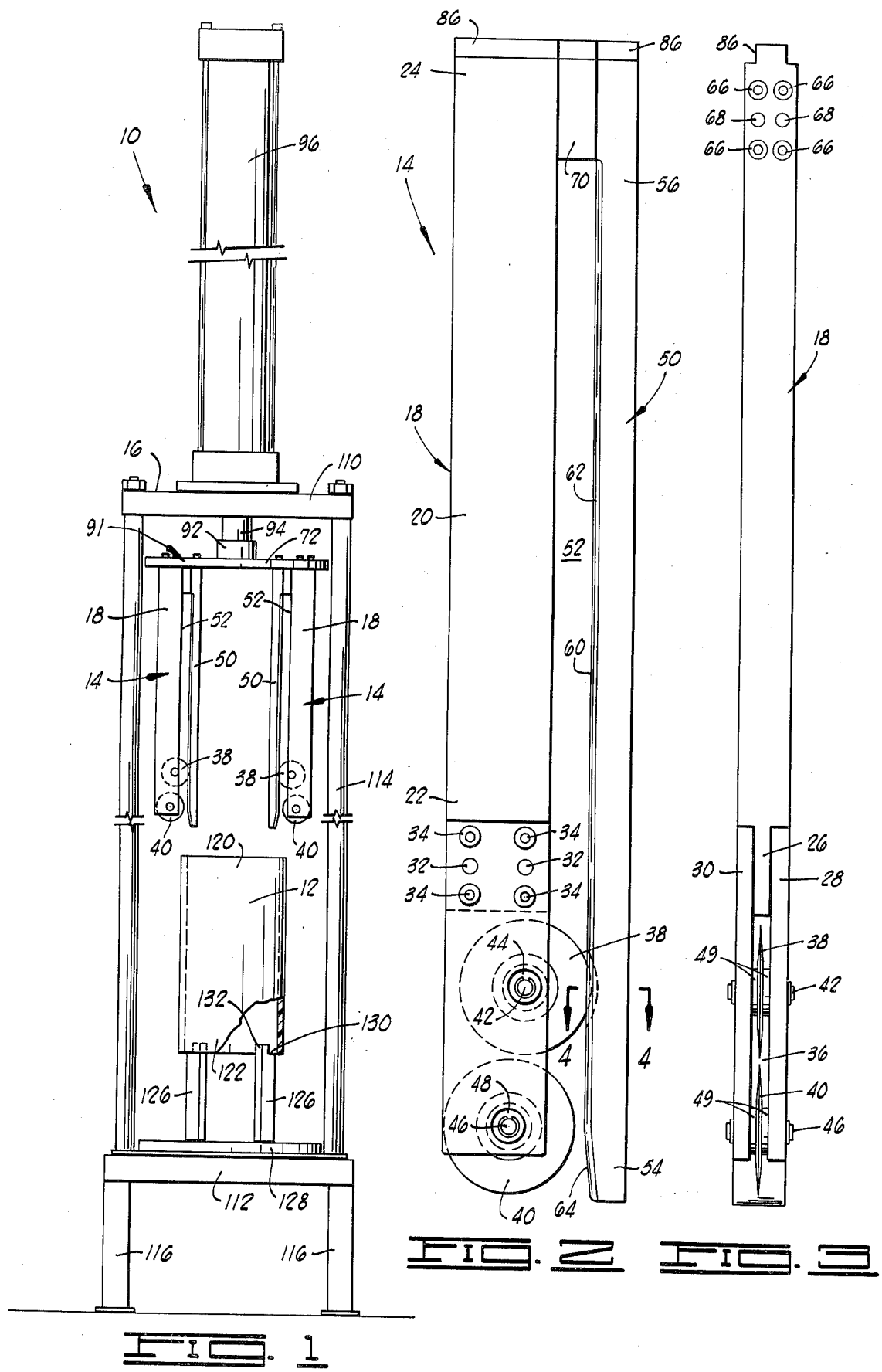

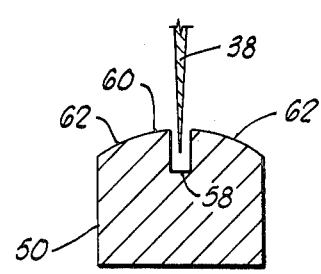
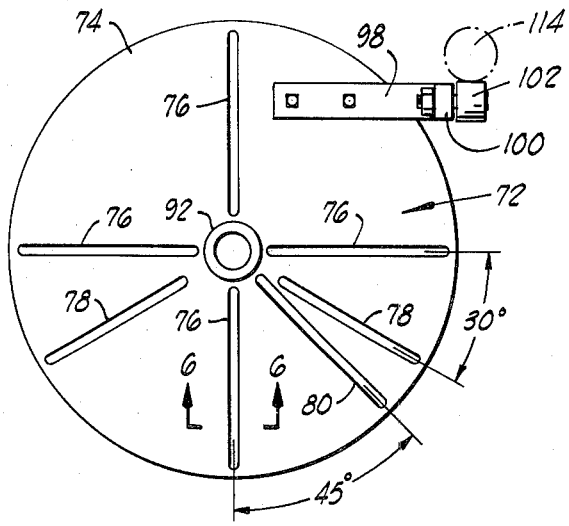
FIG. 4
FIG. 5
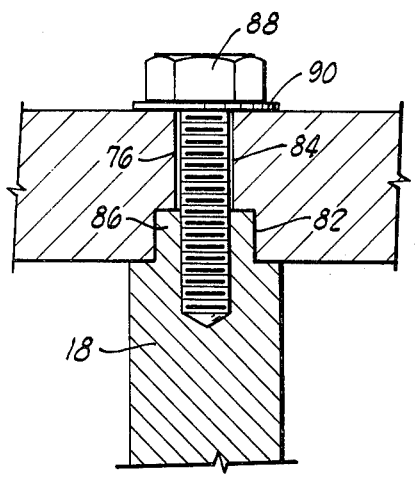
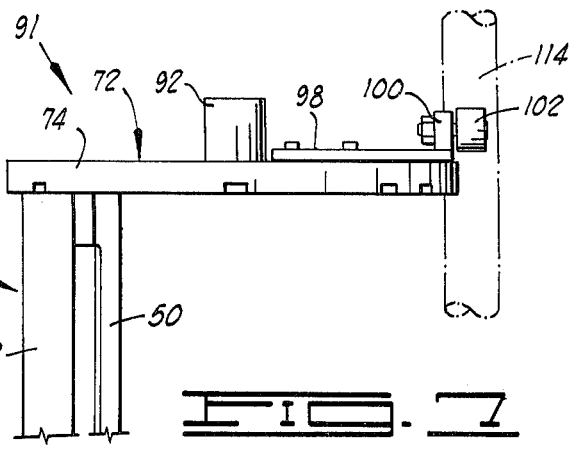
FIG. 6
FIG. 7
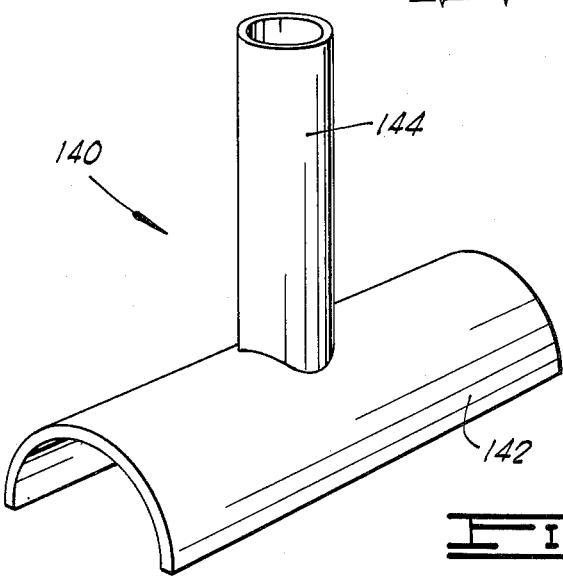
FIG. 8

PIPE SLITTER APPARATUS

BACKGROUND OF THE INVENTION

1. Field of the Invention

The present invention relates generally to the field of material cutting, and more particularly, but not by way of limitation, to the field of slitting pipe and the like.

2. Description of the Prior Art

In pipeline gathering and distribution systems, it is often necessary to connect a lateral line to a primary pipe. One means of connecting the lateral stub to the primary pipe is by connecting the lateral stub over a tapped opening made for the purpose of providing fluid communication to the primary pipe. A tapping saddle is placed over the primary pipe to seal the lateral stub connection to the primary pipe.

The tapping saddle used for this purpose comprises in part a segment cut from a pipe, the inner diameter of which approximates the outer diameter of the primary pipe to which the segment will be overlaid and clamped. The pipe from which the saddle is made is first cut into a desired piece length, and then it is cut lengthwise by slitting the pipe piece into two or more segments. Each of the segments then has a hole cut into its side and a lateral stub connected normally thereat.

In the past, the manufacture of tapping saddles has usually required slitting the pipe pieces by means of sawing or a similar cutting art. While this has been generally satisfactory for slitting metal and the like, there have been problems in the slitting of many non-metallic materials, such as plastics (plastics as used herein means the wide range of polymeric materials and the like that are commonly so called.) The generation of heat usually leads to wall deformation. Further, the cutting tool often is clogged by the tearing action of the cutting tool moving through the material, resulting in an inaccurate cutting line. While these problems are more pronounced in the slitting of thermoplastic materials, they are incurred in the slitting of most plastic materials. In some cases the use of an external coolant during cutting is helpful, but this does not generally resolve the problem adequately.

What has been needed in the manufacture of tapping saddles is an effective and efficient means of slitting pipe pieces into accurately cut segments.

SUMMARY OF INVENTION

It is therefore an object of the present invention to provide an apparatus that accurately cuts segments of plastic pipe pieces and the like.

Another object of the present invention is to achieve the above-stated object while providing an apparatus that cuts segments from plastic pipe pieces and the like with minimum deformation and with maximum trueness of cut.

Another object of the present invention is to achieve the above-stated objects while providing an apparatus that cuts segments from plastic pipe pieces and the like with minimum heat generation.

Another object of the present invention is to achieve the above-stated objects while providing an apparatus that cuts segments from plastic pipe pieces and the like with a minimum of tool clogging.

Another object of the present invention is to achieve the above-stated objects while providing an apparatus that offers simplicity of design and minimizes manufacturing costs and upkeep.

Other objects, features and advantages of the present invention will be apparent from the following specification and claims when taken together with the accompanying drawings.

BRIEF DESCRIPTION OF THE DRAWINGS

FIG. 1 is a semi-detailed elevational view of the present invention.

FIG. 2 is a side view of the blade holder and backup member of the present invention.

FIG. 3 is a top view of the blade holder shown in FIG. 2.

FIG. 4 is a cross-sectional view taken at 4—4 in FIG. 2.

FIG. 5 is a plan view of the first base member.

FIG. 6 is a view of a slot taken at 6—6 in FIG. 5.

FIG. 7 is an elevational view of the first base member with a blade holder and backup member mounted therein.

FIG. 8 is an isometric view of a segment as cut with the present invention and attached to a lateral stub to form a tapping saddle.

DESCRIPTION OF THE PREFERRED EMBODIMENT

Referring to the figures in general and particularly to FIG. 1, the apparatus of the present invention is designated by the numeral 10. FIG. 1 depicts the slitter assembly of the present invention mounted in a press form above a pipe piece 12 that is to be split into pipe segments. As used herein, the word segment means a portion of a pipe piece formed by the longitudinal slitting of the piece to make one or more segments. If two of the cutter assemblies 14 are mounted in the press form 16, the pipe 12 will be slit into two pipe segments. This will become clear with further discussion.

Turning now to FIG. 2, shown therein is the cutter assembly 14. An elongate blade holder 18 comprises a handle member 20 having a first end 22 and a second end 24. FIG. 3 shows a top view of handle member 20, and reference to both FIGS. 2 and 3 will make this discussion clear. The end 22 of handle 20 has been machined to have a relatively narrow web 26 extending therefrom. A pair of plates 28 and 30 are connected to the web 26 and are dimensioned so as to have their external edges flush with the handle 20, as shown. Appropriately sized holes are located through the plates 28 and 30 and the web 26, and dowel pins 32 are placed therethrough. Also, appropriately placed and threaded apertures are placed through the plates 28 and 30 and web 26, and bolts 34 used therein to secure the plates to the handle 20.

The plates 28 and 30, connected to handle 20 as discussed, are generally parallel and form a cutter blade receiving channel 36 therebetween. A first cutter blade 38 and a second cutter blade 40 are mounted for rotation in the cutter blade channel in the following manner. The first cutter blade 38 is mounted on a first blade arbor 42 that is held at each of its ends by a bearing 44, one of which is viewable in FIG. 2. The bearings 44, one of which is in the plate 28 and one of which is in the plate 30, are pressed into appropriately sized apertures that are drilled in these plates. The cutter blade 38 is of the disc type and is rotatable with the arbor 42. A second blade arbor 46 is rotatingly supported by the bearings 48, one of which is viewable in FIG. 2. The bearings 48 are mounted in the plates 28 and 30 in like manner to the bearings 44, and the second blade cutter 40, of the disc type, is rotatable with the arbor 46 in the bearings 48.

The cutter blades 38 and 40 are pressed onto the first blade arbor 42 and second blade arbor 46, resepectively, and are equidistantly spaced from the walls of the plates 38 and 30 in the cutter blade channel 36 by the spacers 49. As shown in FIG. 3, the spacers 49 position the cutters 38 and 40 in cutting alignment; that is, the cutting surfaces of the cutter blades 38 and 40 are coplanar.

The second cutter blade 40 is positioned so as to partially span the pipe wall receiving channel 52 between the blade holder 18 and the backup member 50. This arrangement provides the means to partially cut through a pipe wall, in the manner to be made clear below, with the second cutter blade 40, followed by a complete cut through the pipe wall by the first cutter blade 38. The purpose of this is to provide an easier cut for each of the cutter blades while preventing any clogging thereof. While the second cutter blade 40 is provided in the preferred embodiment described herein, this additional cutter blade is not essential to the invention, as a single cutter blade will suffice for most small diameter pipe. However, some larger sizes are more easily accommodated by the multiple blade arrangement described herein.

A backup member 50 is an elongate member that runs generally parallel to the blade holder 18, the two members forming a pipe wall receiving channel 52 therebetween. The backup member 50 has a first end 54 and a second end 56, the first end 54 positioned in close proximity to the cutter blades 38 and 40. The first cutter blade 38 completely spans the pipe wall receiving channel 52, and a clearing groove 58 is cut into the surface 60 of the backup member 50 to receive a portion of the blade 38 therein. This is shown in the cross-sectional view taken at 4—4 and shown in FIG. 4. This arrangement disposes a cutting edge of the cutter blade 38 completely across the pipe wall receiving channel 52.

As will be clear in the discussion below, the backup member 50 is disposed so as to be pressed against the inside of the pipe piece 12, and in accommodation to the curvature of the cylindrical wall of the pipe piece 12, the backup member is configured as shown in FIG. 4 with relief at the corners 62 so as to clear the inside wall. Also, the first end 54 of backup member 50 is relieved to have a leading ramp edge 64.

The second end 56 of the backup member 50 is connected to the second end 24 of the blade holder 18 by the bolts 66 and dowel pins 68 which are located in appropriately sized aperture through the end portions. A spacer block 70 separates the ends 24 and 56 and defines the distance between the blade holder 18 and the backup member 50 that comprises the depth of the pipe wall receiving channel 52. It is not necessary to the invention herein claimed that the blade holder 18 and the backup member 50 be connected to each other via the spacer block 70 as described, but this provides a handy arrangement wherein the dimensions of the members and the setting apart thereof is controllably established.

The blade holder 18 and backup member 50 are mounted on a first base member 72, shown in FIGS. 5 through 7. The first base member 72 is a circular plate 74 that has a series of radial slots advantageously positioned thereabout. The slots 76 are placed at 90° intervals about the center of circular plate 74. A slot 78 is placed on a 30° radial from one of the 90° slots 76, and the slot 80 is positioned 45° between two of the slots 76. The spacing about the center of the circular plate 74 of the slots is a suggested spacing only, and other spacings may be so positioned as necessary. Each of the slots 76, 78 and 80 pass completely through the circular plate 74 with a stepped profile as shown by the cross-sectional view of FIG. 6 taken at 6—6 of FIG. 5. The portion 82 of the slot 76 is narrower than the portion 84 for the following purpose.

Returning to FIGS. 2 and 3 momentarily, it is seen that the ends 24 and 56 of the blade holder 18 and backup member 50, respectively, have a machined down tab portion 86 extending therefrom and dimensioned to be received in the portion 82 of the slots described in FIG. 5. In FIG. 6, a portion of the blade holder 18 in cutaway view is shown disposed in the slot 76. Appropriately sized and apertured bolt holes are established in the tabs 86 of the blade holder 18 and backup member 50, and bolts 88 with washer 90 are used to secure the blade holder and backup member to the circular plate 74. In this arrangement, the blade holder 18 and backup member 50 are caused to extend from the first base member 72 in the manner shown in FIG. 7 thereby forming the slitter assembly 91.

Welded concentrically with the center of the circular plate 74 is a nipple connection 92 that is internally threaded to receive the threaded male end of a ram 94, shown in FIG. 1 and which serves as power means to move the plate 74 in a manner to be made clear below. The ram 94 is extendable from the fluid actuated cylinder 96 mounted onto the press form 16. As will be understood by persons skilled in the art, the cylinder 96 may be hydraulic or pneumatic, the details of which being conventional and need not be discussed for purposes of this disclosure. Furthermore, the present invention is not restricted to such fluid actuated power means, as mechanical means may also be used. In practice it has been determined that minimal power is normally required for moving plate 74 as the cutter assemblies operate to slit pipe piece 12; for most sizes, manual pressure has been found adequate, and the power means then serves to free the operator's hands to attend the pipe piece.

Bolted to the circular plate 74 is a bearing guide 98 which is comprised of an elongate member having an upturned portion 100 and a bearing 102 that is mounted to an arbor conventionally mounted to the upturned portion 100. The purpose of the bearing 102 is to provide orientation of the circular plate 74 when mounted in the press form 16 as discussed below. While this feature is not required in the present invention, the bearing guide 98 does provide a handy means for orienting the cutting blades.

Returning now to FIG. 1, the first base member 72 has been mounted with a pair of the cutter assemblies 14 as shown for the slitting of pipe piece 12. The press form 16 comprises a frame for holding and manipulating the slitter assembly 91. A top plate 110 is separated from a bottom plate 112 by corner posts 114 in a conventional manner, and support legs 116 are provided of a convenient height to establish the working implements at a level whereat personnel can readily work. The fluid actuated cylinder 96 is mounted to the top plate 110 and its extendable ram 94 is disposed through an appropriately sized aperture so as to be connectable to the internally threaded nipple 92 of the first base member 72. Conventional fluid control of the extendable ram 94 pushes the slitter assembly 91 downwardly so as to engage the wall of the pipe piece 12.

In order to cut completely through the pipe piece 12 from its first end 120 to its second end 122, it is necessary to support the pipe piece 12 in a manner permitting the cutter blades 38 and 40 to pass completely from the first end 120 to and through the second end 122 of the pipe piece 12. The standoff assembly 124 comprises a plurality of standoff members 126 that are mounted normally to a second base member 128. The second base member 128 is similar in detail and operation of the first base member 72, with the exception that the nipple 92 is excluded. Therefore, a drawing of the second base member 128 is not included, it being sufficient for purposes of this disclosure to state that the second base member 128 has a plurality of slots similar to the slots 76, 78 and 80 that are disposed in the circular plate 74, and the slots disposed in second base member 128 have a similar profile of those slots as shown in section 6—6 in FIG. 6. One end of each of the standoff members 126 has a machined tab portion similar to the tabs 86 of the blade holder 18 and backup member 50, the tabs of the standoff members 126 being fittingly received by the slots in the second base member 128 and securedly retained therein by means of bolts and washers in the manner shown in FIG. 6. The slots in second base member 128, being radially extensive from the center of the base member, permit adjustment of the standoff members 126 to accommodate various sizes of pipe pieces to be supported. The pipe pieces 12 is supportingly connected by the other ends of the standoff members 126, each of which has a supporting shoulder 130 and a guide tab 132 as shown in the cutaway of pipe piece 12 in FIG. 1. The second base member 128 may be secured to the bottom plate 112 in a convenient manner.

While the ram 94 has been shown connected to the first base member 72, it will be understood that the present invention would be as readily operable if the ram 94 were made connectable to the second base member 128, in which case the first base member would need be held stationary. Such an arrangement has been constructed, but it was determined that the pipe piece 12 was raised out of the convenient reach of the operating personnel. It is believed to be a more convenient arrangement to make the pipe piece 12 occupy a fixed position as was described for the preferred embodiment above.

OPERATION OF THE PREFERRED EMBODIMENT

The operation of the pipe slitter apparatus of the present invention is best understood by referring to the setup of the components as shown in FIG. 1. Shown therein is the first base member 72 connected to the extendable ram 94 of the fluid actuated cylinder 96. As will be understood, as the ram 94 is caused to extend, the first base member 72 will be pushed downwardly in the press form 16. Mounted to the underside of the first base member 72, and together with the first base member forming the slitter assembly 91, are cutter assemblies 14 comprising the blade holders 18 and the backup members 50. While two of the cutter assemblies 14 are shown in FIG. 1, it will be understood that as few as one may be used in the contemplation of the present invention, or several may be used to slit the pipe piece 12. The slots 76, 78 and 80 extend radially from the center of the circular plate 74, and the blade holders 14 may be adjusted as necessary toward or away from the center, the distance therefrom being determined by the diameter of the pipe piece 12, it being the object to establish the cutter assemblies 14 so that the pipe wall receiving channels 52 will receive the wall of the pipe piece 12, it being the object to establish the cutter assemblies 14 so that the pipe wall receiving channels 52 will receive the wall of the pipe piece 12. When the cutter assemblies 14 are correctly positioned, the extension of ram 94 will cause the pipe receiving channels 52 to correctly receive the pipe wall as they are pushed downwardly against the first end 120 of the pipe piece 12.

As the first base member 72 is moved downwardly by the extension of ram 94, the bearing 102 is caused to roll against one of the rods 114 to provide orientation of the cutter blades relative to the pipe piece 12. While this orientation is usually sufficient, there may be an occasion wherein addition guiding means may be required, and these are provided by conventional machine shop methods.

The standoff members 126 are positioned in the radial slots of the second base member 128 so as to support the pipe piece 12 at the second end 122 thereof. The standoff members 126 are oriented so as to permit the blade holders 18 and backup members 50 to pass therebetween during the downward slitting of pipe piece 12, thereby permitting the complete slitting of pipe piece 12 into sectors.

The slitter apparatus 10 described hereinabove has proven to be a very effective and efficient mechanism for the accurate manufacture of a pipe segment such as that which is shown as a part of the saddle 140 shown in FIG. 8. The pipe segment 142 has been made by the slitting of a pipe piece 12 into two portions, each portion of which will be a 180° sebment of that pipe piece. Depending upon the particular application, segments may be required that vary in angular arc dimension of the slit pipe; that is, segments may be required that range, for example, from 60° to 180°, although there are some applications requiring angular portions. It will be understood that to cut a 60° segment from a pipe piece 12, three such segments may be cut simultaneously by the use of cutter assemblies positioned on the first base member (appropriately spaced radial slots must be therein provided), or the segments may be cut individually. As shown in FIG. 8, the tapping saddle 140 has been completed by the attaching of the normally extending lateral stub 144, and by providing an aperture in the side of segment 142 to give fluid communication through the lateral.

It is clear that the present invention is well adapted to carry out the objects and attain the ends and advantages mentioned as well as those inherent therein. While a presently preferred embodiment of the invention has been described for purposes of this disclosure, numerous changes may be made art and which are encompassed within the spirit of the invention as disclosed and as defined in the appended claims.

What is claimed is:

1. Apparatus for slitting pipe wall, comprising:
   a slitter assembly characterized as comprising:
   a first base member;
   a blade holder supported by the first base member;

a backup member supported by the first base member and forming with the blade holder a pipe wall receiving channel;

a first cutter blade supported on the blade holder disposed to extend across the pipe wall receiving channel; and a second cutter blade supported by the blade holder in cutting alignment with the first cutter blade, the second cutter blade disposed in the pipe wall receiving channel and extending partially across the pipe wall receiving channel;

holding means for holding the pipe wall in relative spatial relationship to the slitter assembly; and, power means for moving the slitter assembly relative to the holding means.

2. The apparatus of claim 1 wherein the holding means is characterized as comprising:

a second base member;

a standoff assembly disposable in supporting relationship to one end of the pipe so that the pipe is held in spatial relation to the second base member, the standoff assembly having clearing relationship to the slitter assembly.

3. The apparatus of claim 2 wherein the power means is characterized as comprising:

an extendable ram having one end connected to the first base assembly.

4. The apparatus of claim 1 wherein the slitter assembly is further characterized as comprising:

a rotatable first blade arbor bearingly supported by the blade holder;

a rotatable second blade arbor bearingly supported by the blade holder; and, the first cutter blade is a disc cutter and mounted on the first blade arbor, and the second cutter blade is a disc cutter and mounted on the second blade arbor.

5. Apparatus for splitting pipe wall, comprising:

a slitter assembly for slitting a pipe wall commencing from one end thereof, comprising:

a first base member;

a blade holder connected to the first base member;

a backup member connected to the first base member, the backup member and the blade holder supported in spaced apart relationship and defining a pipe wall receiving channel therebetween;

a first blade connected to the blade holder, a portion of the first blade disposed to span the pipe wall receiving channel; and, a second blade connected to the blade holder in cutting alignment with the first cutter blade, a portion of the second blade disposed to partially span the pipe wall receiving channel.

6. The apparatus of claim 5 further comprising:

a second base member; and, a plurality of standoff members connected to the second base member and restrainingly connectable with the opposite end of the pipe wall.

7. The apparatus of claim 6 further comprising:

a press frame, the second base assembly supported thereby; and, power means supported by the press frame for moving the first base assembly selectively toward and away from the second base assembly.

8. The apparatus of claim 5 wherein the slitter assembly is further characterized as comprising:

a rotatable first blade arbor bearingly supported by the blade holder;

a rotatable second blade arbor bearingly supported by the blade holder; and, the first and second cutter blades are disc cutter blades, the first cutter blade is mounted on the first blade arbor and the second cutter blade is mounted on the second blade arbor.

9. Apparatus for slitting pipe wall, comprising:

a press frame;

a slitter assembly for slitting a pipe wall commencing from one end thereof, comprising:

a first base member;

a blade holder connected to the first base member;

a backup member connected to the first base member, the backup member and the blade holder supported in spaced apart relationship and defining a pipe wall receiving channel therebetween;

a first blade connected to the blade holder, a portion of the first blade disposed to span the pipe wall receiving channel; and, a second cutter blade connected to the blade holder in cutting alignment with the first cutter blade, a portion of the second blade disposed to partially span the pipe wall receiving channel;

a second base member;

a standoff assembly disposable in supporting relationship to the opposite end of the pipe so that the pipe is held in spatial relation to the second base member, the standoff assembly having clearing relationship to the slitter assembly; and, power means supported by the press frame for moving the first base assembly selectively toward and away from the second base assembly.

10. The apparatus of claim 9 wherein the slitter assembly is further characterized as comprising:

a rotatable first blade arbor bearingly supported by the blade holder;

a rotatable second blade arbor bearingly supported by the blade holder; and, the first and second cutter blades are disc blade cutters, the first cutter blade being mounted on the first blade arbor and the second cutter blade being mounted on the second blade arbor.

* * * * *